(12) United States Patent
Schang

(10) Patent No.: US 8,495,509 B1
(45) Date of Patent: *Jul. 23, 2013

(54) CROSS-VIEW UNDO/REDO FOR MULTI-VIEW EDITING ENVIRONMENTS

(75) Inventor: Jeffrey Schang, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/111,016

(22) Filed: May 19, 2011

Related U.S. Application Data

(63) Continuation of application No. 10/831,529, filed on Apr. 23, 2004, now Pat. No. 7,979,804.

(60) Provisional application No. 60/466,231, filed on Apr. 28, 2003.

(51) Int. Cl.
*G06F 3/048* (2006.01)

(52) U.S. Cl.
USPC ........... 715/763; 715/762; 717/109; 717/110; 717/113

(58) Field of Classification Search
USPC .................. 715/762, 763; 717/109, 110, 113
See application file for complete search history.

(56) References Cited

U.S. PATENT DOCUMENTS

| | | | | |
|---|---|---|---|---|
| 6,237,135 | B1 * | 5/2001 | Timbol | 717/107 |
| 2002/0059345 | A1 * | 5/2002 | Wang et al. | 707/513 |
| 2003/0237046 | A1 * | 12/2003 | Parker et al. | 715/513 |
| 2004/0036698 | A1 * | 2/2004 | Thurner et al. | 345/619 |
| 2004/0078297 | A1 * | 4/2004 | Veres et al. | 705/27 |
| 2004/0205488 | A1 * | 10/2004 | Fry | 715/501.1 |
| 2004/0205663 | A1 * | 10/2004 | Mohamed | 715/530 |
| 2005/0229101 | A1 * | 10/2005 | Matveyenko et al. | 715/530 |
| 2007/0118793 | A1 * | 5/2007 | Arora et al. | 715/501.1 |
| 2007/0157083 | A1 * | 7/2007 | Roy et al. | 715/522 |

OTHER PUBLICATIONS

Pinellas County School Instructional Technology; Dreamweaver 4.0; Copy Right 2001; 37 pages.*
Examiners Answer dated Apr. 17, 2008 in related U.S. Appl. No. 10/831,529.
Office Action dated Apr. 9, 2007 in related U.S. Appl. No. 10/831,529.
Office Action dated Sep. 21, 2007 in related U.S. Appl. No. 10/831,529.

* cited by examiner

*Primary Examiner* — Doon Chow
*Assistant Examiner* — Linh K Pham
(74) *Attorney, Agent, or Firm* — Kilpatrick Townsend & Stockton LLP

(57) ABSTRACT

An editing environment is disclosed having both a design and code views, each with its own undo/redo stacks. The editing environment includes logic to form an object that encapsulates the edits and changes made during a code view editing session. The object is associated or pointed to an element in the design view undo/redo stack. When the editing environment receives an undo/redo command in which a code view edit block is to be undone, the design view takes the specific object, which is then translated back into the proper format for code view execution. The code view then executes the undo/redo entries and returns any remaining code view edits that were not undone or redone, to the design view to place back into a code view edit block in either of the design view undo/redo stacks, along with the new related object.

22 Claims, 6 Drawing Sheets

CROSS-VIEW UNDO/REDO FOR MULTI-VIEW EDITING ENVIRONMENTS

CROSS REFERENCE TO RELATED APPLICATION

The present application is a continuation application of U.S. Ser. No. 10/831,529 filed on Apr. 23, 2004 now U.S. Pat. No. 7,979,804, now allowed, which is related to and claims benefit from previously filed, and commonly-assigned U.S. Provisional Patent Application No. 60/466,231, filed Apr. 28, 2003, entitled "CROSS-VIEW UNDO/REDO FOR MULTI-VIEW EDITING ENVIRONMENTS," the disclosures of both of which are hereby incorporated herein by reference.

TECHNICAL FIELD

The present invention relates, in general, to editing environments and, more particularly, to a cross-view undo/redo for multi-view editing environments.

BACKGROUND OF THE INVENTION

Various editing environments exist for designing, developing, and authoring any number of applications, documents, art, or the like. The configuration of the editing environment is generally tailored to the particular output that is being edited. Application editing environments are typically code- or text-oriented, while art editing environments are typically visual- or design-oriented. Some elements, such as Web pages or Web sites, combine both an application or logic aspect as well as an artistic or visual aspect. Thus, editing environments for such cross-discipline matters may include both code or text orientation and artistic or visual orientation.

As the importance of the presentation of the Internet has grown, hypertext markup language (HTML) editors have evolved from simple code editors to visual editors that render the HTML to the designer and that allow the designer to visually edit the design while letting the HTML editor program automatically generate the underlying HTML code. HTML is a markup language that uses tags on data to define the formatting of that data. HTML is the language of the Web that describes how to present the content of the Web page to the user. HTML editors, such as MACROMEDIA's DREAMWEAVER™, MICROSOFT FRONTPAGE™, and the like, are commonly used by Web designers to generate the HTML code for Web pages and Web sites, as well as place the visual portions of the site or page. Modern Web pages and Web sites also include considerable embedded non-HTML code or script. However, HTML still forms the basis for much of the Web. Some HTML editors, such as MACROMEDIA's DREAMWEAVER™, MICROSOFT CORPORATION's FRONTPAGE™, and the like, allow editing in both a visual and a code view either separately or concurrently.

Combined editing environments, such as MACROMEDIA's DREAMWEAVER™ include both a design/visual view and a code/text view, typically both visible to the user on the same display. In the design view, developers have the ability to view and edit a Web page in a visual mode in which the HTML code has been rendered, as if on a Web browser. While the developer works on the rendered objects, the editing environment translates and effects those changes in the underlying HTML document. In contrast, the code view provides a simple text editor in which the actual HTML code is displayed to the user. The developer would typically edit the code directly when working in the code view.

In the design view mode, the HTML is usually rendered through a document object model (DOM), which is typically a tree structure that represents all of the HTML constructs. HTML is a markup language that uses tags on data to define the formatting of that data. The design view typically acts as a Web browser by rendering the HTML tags in the design view editing window. The design view internally represents the configuration of the HTML file using its DOM. The DOM basically consists of the HTML tags formed into a logical tree structure that represents the format of the HTML page. Therefore, if a developer edits a page within the design view, such as to copy and paste a paragraph to another location, the HTML editor typically takes a snapshot of the node in the DOM tree that contains the paragraph being copied and pasted and inserts that node in the newly designated place on the logical tree structure.

Because developers/users are typically allowed to work in either the design view or the code view modes, there is typically undo and redo functionality in both views. Moreover, the undo/redo in each view are usually merged or synchronized to some extent in order to fully effect changes made in either view. As a user edits a particular document in the code view and then switches to the design view, the code view edits would usually get combined together into a single step in the design view undo stack. Therefore, regardless of the number of different edits that were made in the code view, such as copying, pasting, and deleting items, when the user switches to the design view, the individual-step history would typically be lost, converted instead into a single operation in the design view undo stack. This action creates difficulties for users/developers who may generally have to work in both the code view and the design view and who wish to retain the ability to selectively undo or redo edits made in the code view. Typically, those individual edits made in the code view would usually be lost once the user enters the design view. This problem is generally encountered because most such editing environments dispose of the undo/redo stacks in the code view once the user/developer switches to the design view for any visual editing activity.

In the basic operation of undo and redo in the design view, as edits are made, there is a facility to keep track of the changes made in order to be able to undo those changes. Each time an edit is made, an edit cycle is generally executed which notifies the program that an edit is about to be made. The next steps in the edit cycle are usually the detection of changes in the DOM tree data structure and a notification that the edits are complete. At the point that the notification is received, the portion of the tree that has changed is determined and then typically copied in memory. That copy is then placed onto the undo stack. This process takes extra memory to store the edit on the undo stack. Furthermore, as each additional edit cycle is completed, another entry is added to the undo stack. When the user executes an undo command, the first entry from the undo stack is typically "popped" off. The portion of the tree that was affected is then usually placed or pushed onto the redo stack. The portion of the tree that was affected is then generally replaced with the copy from the undo stack. Thus, an undo command takes or pops one item off of the undo stack and places or pushes another item onto the redo stack.

The data structure for the undo/redo stacks are generally different for the design view and code view. In the code data structures, there is essentially a big array of characters, much like a buffer of characters. An edit may insert, delete, or replace characters. When an edit is performed, such as inserting a character, the state of the document is saved before the edit occurs. Along with the state of the document, the characters being inserted, deleted, or replaced are typically copied in memory and pushed onto the code view undo stack followed, in general, by the changes being made in the actual code data structure. The state is generally indicative of the location and range in which the edit will occur, such as the point where the character will be inserted. Along with the state, the actual inserted and/or deleted characters will then also be saved onto the undo stack. Therefore, the system keeps the information it needs in order to undo, which generally involves the edited data as well as the location where the edited data was edited. If an undo is performed, the information is generally taken off of the undo stack and placed onto the redo stack.

Because the design view is usually represented in the tree structure of a DOM, the design view data structure is also typically more like a tree data structure, instead of the character buffer of the code view. As edits are made in the design view, a snap shot of the portion of the DOM tree structure that was changed is placed onto the design view undo stack unlike the code view undo stack which just places a copy of the characters. The undo/redo operations operate similarly from that basic difference.

When the developer switches focus from the design view to the code view, or vice versa, the two views are typically synchronized to reflect the edits made in one or the other views. For example, when the developer makes edits in the design view, but then switches focus to the code view, the system basically takes the entire DOM tree and writes the entire page out again as source code in the code view screen. Therefore, each time an edit is made in the design view, the entire code view is replaced with the new, corresponding code. This synchronization is generally faster than when synchronizing a move from the code view to the design view. This is so because there are generally pre-determined code blocks associated with visual edits made in the design view. Therefore, when the system detects the change in a node of the DOM tree, a pre-determined chunk of code is available to be generated directly into the code view.

This pre-determined information is typically not available when moving from the code view to the design view because the code, which is entered in an ad hoc fashion by the developer, is parsed and processed before the resulting visual elements can be known or viewed. Therefore, the synchronization after going from the code view to the design view is relatively slower. When changes are made in the code view the entire code view buffer is typically passed to the design view to be parsed, after which the DOM tree structure is generated. The new DOM tree data structure will then usually be compared by the design view to the existing DOM to determine exactly which portions of the file have changed. Once the change has been detected, that portion of the DOM tree structure is replaced by its change in the new DOM tree structure. Thus, the changes made in the code view are reflected in the design view.

FIG. 1 is a block diagram illustrating typical editing environment 10 having design view 100 and code view 101. Because the content of design view 100 is typically rendered from HTML or some such other markup language, its format can generally be broken into a representative DOM tree structure with the content of the HTML file represented by the nodes of the tree. As the user performs edits in design view 100, editing environment 10 takes snap shots or copies of the changed nodes and saves them into undo stack 102 (or redo stack 103) along with some additional information on the location of the edited node. Conversely, in code view 101, undo stack 104 and redo stack 105 are usually simple arrays that hold a certain number of characters entered into code view 101 along with some additional information of where the code edit occurred.

Because existing editing environments tend to include both a design view and a code view, methods for synchronizing and combining the two views and their respective undo/redo stacks have been implemented. Undo stack 102 and redo stack 103 of design view 100 include code view edits in code undo entry 106 and code redo entry 107. The operation of both views, design view 100 and code view 101, is very different. The mechanism for processing instructions design view 100 and code view 101 instructions is also very different.

In practice, when a user switches from editing in code view 101 to editing in design view 100, editing environment 10 assembles undo stack 104, which comprises each step entered in the code view, into a single design view 100 action such as code undo entry 106. Editing environment 10 usually purges or deletes undo stack 104 or redo stack 105 of code view 101 once the user switches to design view 100 and transfers undo stack 104 into a design view undo entry, such as code undo entry 106. Therefore, several different edits made during an edit session in code view 101, would be represented by a single design view 100 undo action, such as code undo entry 106. While this solution brings both design view 100 and code view 101 edits into the same design view 100 undo 102 and redo 103 stacks, it generally does not allow for a singular code view 101 edit to be singly undone or redone once the user switches to design view 100. Furthermore, because editing environment 10 usually erases undo/redo stacks 104 and 105 upon transferring the contents of undo stack 104 to design view 100, the ability to access the individual edits from code view 101 may be lost forever.

BRIEF SUMMARY OF THE INVENTION

Representative embodiments of the present invention are directed to a system and method for an editing environment having both a design and code view, each with its own undo/redo stacks containing code view edit blocks. The editing environment includes logic to form an object that represents each of the edits and changes made during the editing session within the code view. The object is associated or pointed to the code view edit block. When the editing environment receives an undo/redo command in the design view in which a code view edit block is to be undone/re-done, the design view takes the specific object, passes the individual edits that are encapsulated within that object to the code view, which then loads the code view undo/redo edit stack. The code view may then execute the undo or redo command for each individual code view edit. When the undo/redo is completed, the code view can then package the remaining contents of the code view undo and/or redo stacks into the object to be re-associated with an undo/redo element within the design view undo/redo stacks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 9A is a pseudocode listing illustrating a conceptualized code view undo stack.

DETAILED DESCRIPTION OF THE INVENTION

Figure 1:
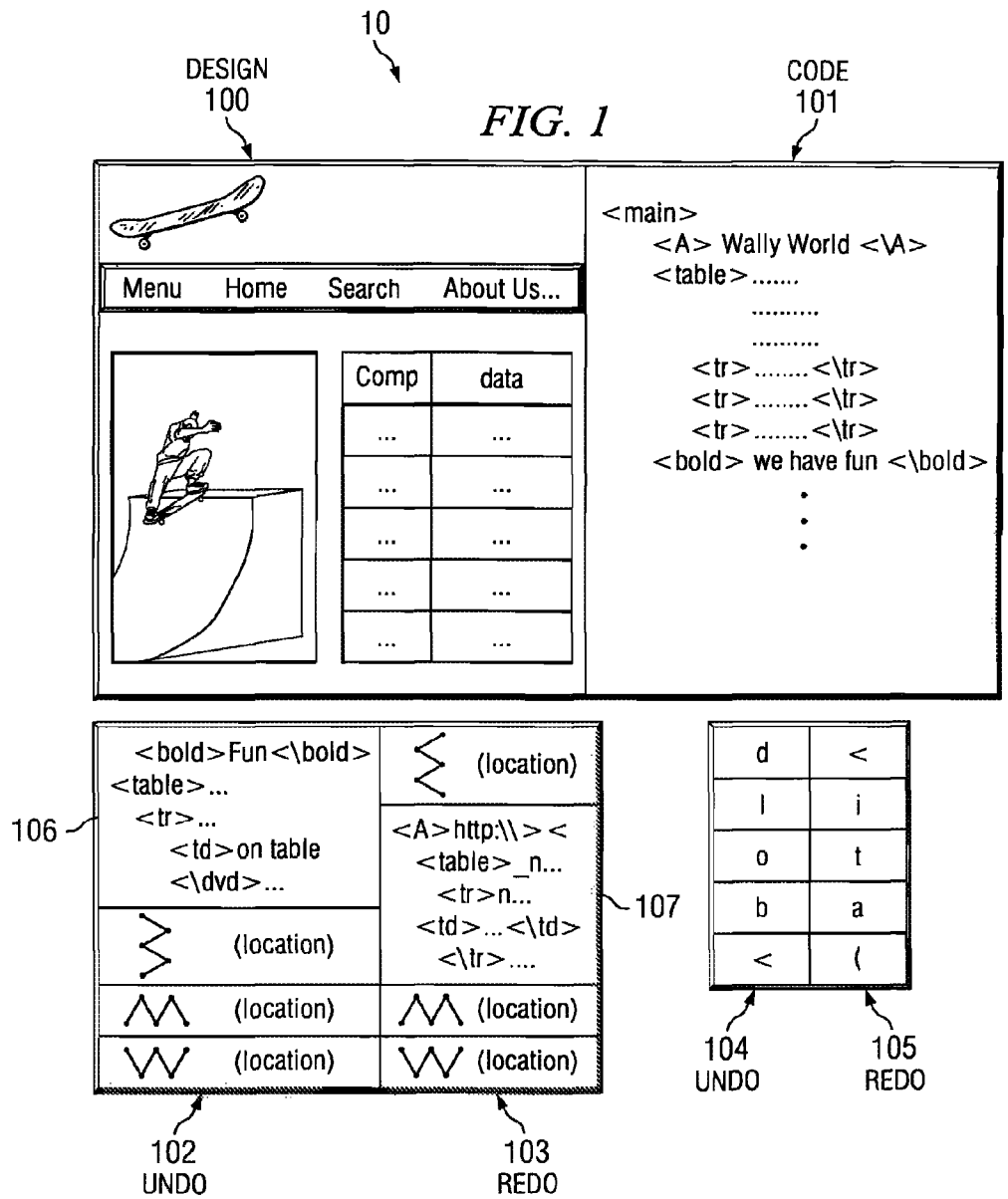
FIG. 1 is a block diagram illustrating a typical editing environment having a design view and a code view.
Figure 2:
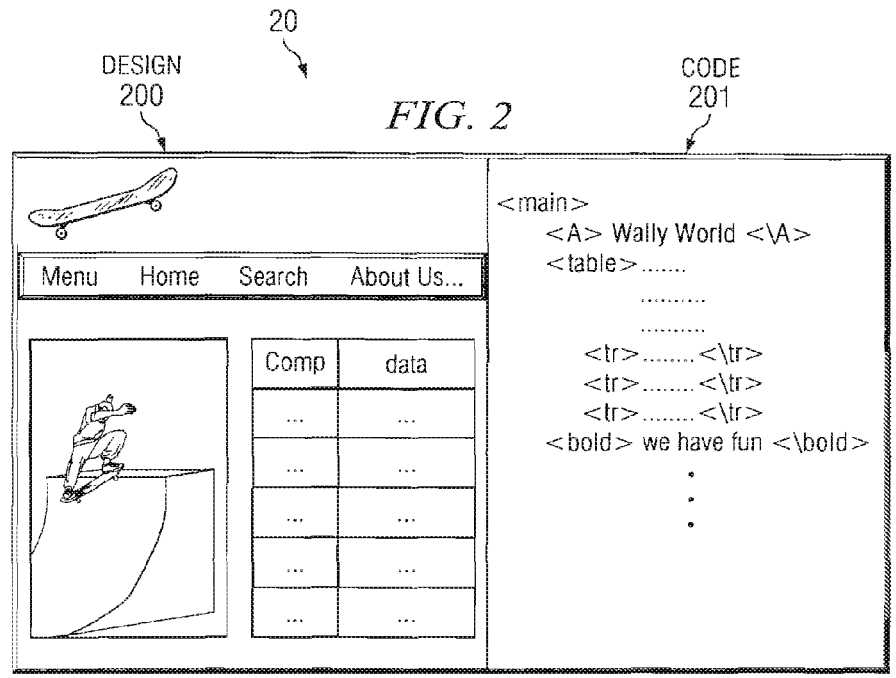
FIG. 2 is a block diagram illustrating an editing environment configured according to one embodiment of the present invention.

FIG. 2 is a block diagram illustrating one embodiment of editing environment 20 configured according to the present invention. Editing environment 20 is similar to editing environment 10 having both design view 200 and code view 201, each with its own undo/redo stacks 202-205, containing code view edit blocks 206 and 208. However, editing environment 20, configured according to one embodiment of the present invention, includes logic to form an object that represents each of the edits and changes made during the editing session within code view 201. Object 207 is associated or pointed to code view edit block 206. When editing environment 20 receives an undo/redo command in which the top entry on the stack is a code view edit block, such as blocks 206 and 208, design view 200 takes objects 207 and 209, passes them to code view 201, which then translates each of the changes back into the proper format for code view 201. Code view 201 then executes the entries and returns any remaining code view edits that were not undone or redone, to design view 200 to place back into a code view edit block in either undo/redo stacks 202 and 203, along with the new related object.

Figure 3:
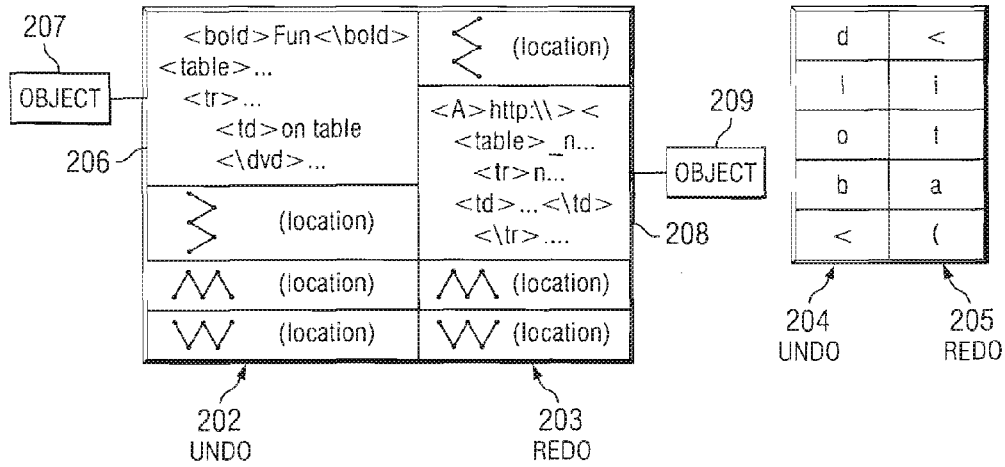
FIG. 3 is a block diagram detailing the interaction between a design view and a code view of one embodiment of the present invention.

FIG. 3 is a block diagram detailing the interaction between design view 200 and code view 201 of one embodiment of the present invention. Code view edit block 208 has its associated object 209 within redo stack 203 (FIG. 2) of design view 200. When the user issues a redo command, design view 200 detects object 209 and sends it to reconstructor 300 to reconstruct the individual code view 201 edits. The reconstructed edits are shown as steps 1-5. If the user only issues two redo commands, code view 201 redoes steps 5 and 4 and then would reconstruct code view edit block 208 and object 209 from the remaining code view steps 1-3 through reconstructor 300.

Figure 4:
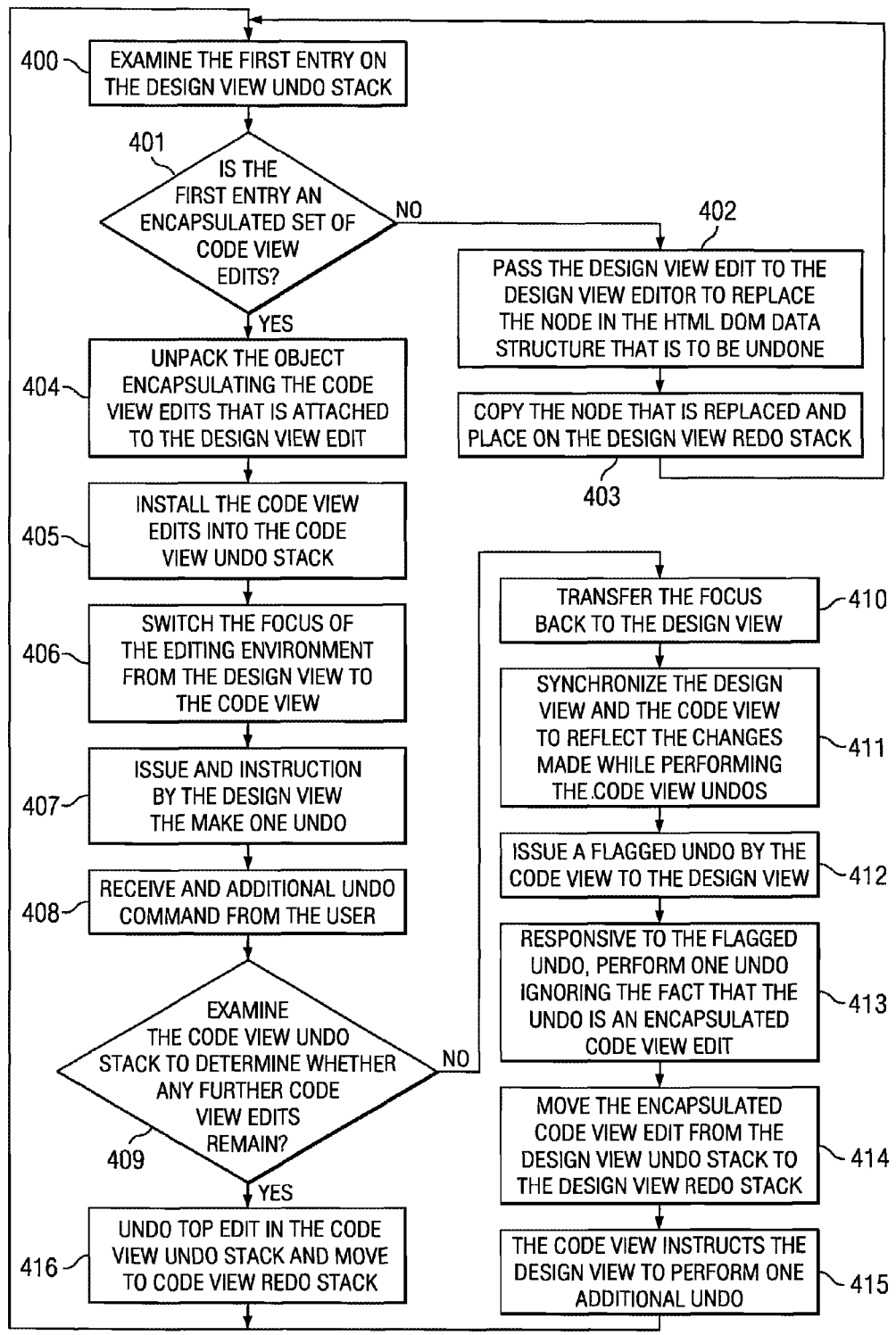
FIG. 4 is a flowchart illustrating example steps executed in implementing one embodiment of the present invention.

FIG. 4 is a flowchart illustrating example steps executed in implementing one embodiment of the present invention. The example illustrated in FIG. 4 begins with the developer selecting an undo action in the design view. In step 400, upon the receipt of the undo command, the design view system examines the first entry on the design view undo stack. In step 401, it is determined whether the first entry is a design view action or if it is an encapsulated set of code view edits. If the first entry is a design view edit, the design view edit is then passed to the design view editor, in step 402, to replace the node in the HTML DOM data structure that is to be undone. The node that is replaced is then copied and placed on the design view redo stack in step 403.

If the first entry in the design view undo stack is, instead, a set of code view edits, the focus is switched to the code view and the object encapsulating the code view edits that is attached to the design view edit is unpacked in step 404. In step 405, the code view edits are then installed into the code view undo stack. Once the code view stack is loaded, the focus of the editing environment is switched from the design view to the code view in step 406. Switching the focus of the editing environment basically means switching the control of the environment. When the focus is with the design view, the developer is typically operating in the design view. Similarly, when the focus is with the code view the developer is typically operating in the code view. When the design view causes the focus to change to the code view, the developer typically switches from working in the design view to working in the code view. After the focus is switched to the code view in step 406, an instruction is issued by the design view, in step 407, to make one code view undo.

In step 408, the system receives an additional undo command from the user. Upon receipt of the additional undo command, the code view examines the code view undo stack, in step 409, to determine whether any further code view edits remain. If there are more code edits to undo, then the top edit in the code view undo stack is undone and the code edit is moved to the code view redo stack in step 416 and the user may issue further undo commands while still working in the code view. Upon receipt of the additional undo command, the code view examines the code view undo stack in step 409. If no more code view edits are in the code view undo stack, the focus is transferred back to the design view in step 410. The design view and code view are then synchronized, in step 411, to reflect the changes made while performing the code view undos and the focus is switched back to the design view.

When switching the focus of the editing environment between the design view and the code view, in step 404, to undo one of the encapsulated code view edits, the design view edit which contains the set of encapsulated code view edits remains on the top of the design view undo stack. In order to move that design view edit from the top of the design view undo stack to the design view redo stack, the code view, during the process of passing focus back to the design view, issues a flagged undo to the design view in step 412. The flagged undo is an undo with a flag associated with it that instructs the design view to perform one undo, in step 413, yet ignore the fact that the undo is an encapsulated set of code view edits. In response to the design view performing the undo operation, the encapsulated set of code view edits is moved from the design view undo stack to the design view redo stack in step 414. Finally in step 415, the code view instructs the design view to perform one additional normal undo, re-entering step 400 thus, completing the undo operation that was initiated, in step 408, by the user while operating in the code view.

Figure 5:
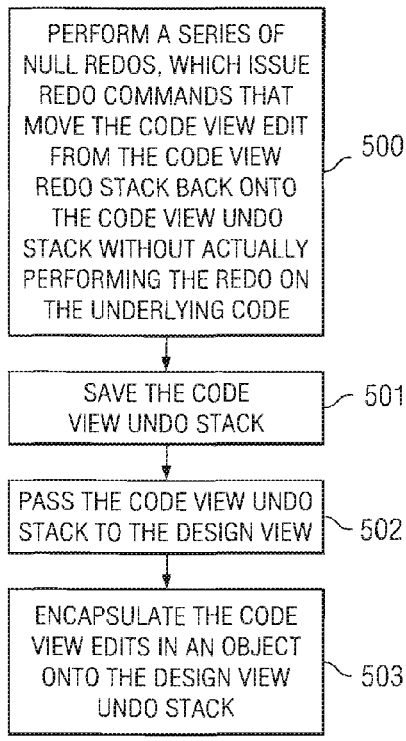
FIG. 5 is a flow diagram illustrating steps executed during the synchronization between the code view and design view during certain steps reflected in FIG. 4.

FIG. 5 is a flow diagram illustrating steps executed during the synchronization between the code view and design view during step 411 of FIG. 4. In the embodiment illustrated in FIGS. 4 and 5, the editing environment is capable of saving and/or synchronizing only the undo stack in the code view. One example of such an editing environment is MACROMEDIA INC.'s DREAMWEAVER™. After each of the edits in the code view undo stack is undone, those edits or actions move from the code view undo stack, where they were initially loaded by the design view, to the code view redo stack. Therefore, if each of the code view edits were undone, the undo stack will be empty while the redo stack will not. Because the embodiment of the editing environment described cannot save or synchronize the code view redo stack, the edits are then moved back to the undo stack.

In step 500, the code view performs null redos, which issue redo commands that move the code view edit from the code view redo stack back onto the code view undo stack without actually performing the redo on the underlying code. The code view undo stack is saved in step 501 and passed to the design view in step 502. The code view edits are encapsulated back onto the design view undo stack in step 503. Once there, steps 412-416 are executed as described in FIG. 4.

It should be noted that in various embodiments of the present invention, both the code view undo and redo stacks may be saved and synchronized with the design view. In such embodiments, the first part of the synchronization process described in FIG. 5 would be unnecessary. Instead of returning each of the code view edits to the undo stack, the code view redo stack may be saved and passed directly to the design view.

Figure 6:
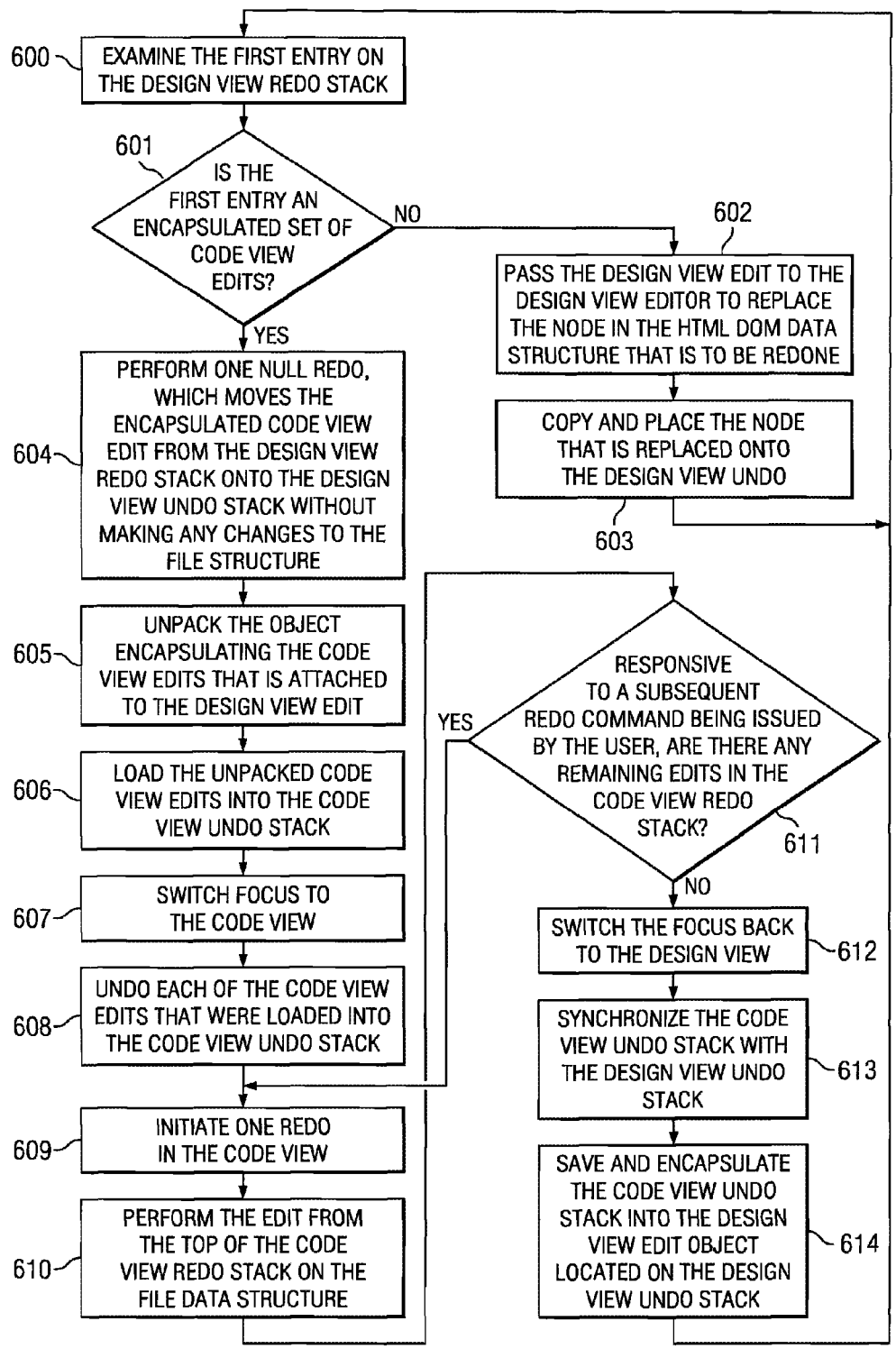
FIG. 6 is a flowchart illustrating example steps performed in executing redo commands initiated in the design view of an editing environment configured according to one embodiment of the present invention.

The procedures reflected in the descriptions of FIGS. 4 and 5 show example steps performed in executing undo commands initiated in the design view. FIG. 6 is a flowchart illustrating example steps performed in executing redo commands initiated in the design view of an editing environment configured according to one embodiment of the present invention. The example illustrated in FIG. 6 begins with the developer selecting a redo operation from the editing environment. In step 600, upon the receipt of the redo command, the design view system examines the first entry on the design view redo stack. In step 601, it is determined whether the first entry is a design view action or if it is an encapsulated set of code view edits. If the first entry is a design view edit, the design view edit is then passed to the design view editor, in step 602, to replace the node in the HTML DOM data structure that is to be redone. The node that is replaced is then copied and placed on the design view undo stack in step 603.

If the first entry in the design view redo stack is, instead, a code view edit, the design view performs one null redo, in step 604, which moves the encapsulated set of code view edits from the design view redo stack onto the design view undo stack without making any changes to the file structure. In step 605, the object encapsulating the code view edits that is attached to the design view edit is unpacked and loaded into the code view undo stack in step 606. It should be noted that in the embodiments described in FIGS. 4-6, the editing environment is capable of only saving an undo stack. Therefore, the object attached to the design view redo will be in an undo sequence. As the code view undo stack is loaded in step 606, focus of the editing environment is switched to the code view in step 607.

Because the editing process of FIG. 6 began with the issuance of a redo command in the design view, in step 608, the code view undoes each of the edits that were loaded into the code view undo stack in step 606. Once this undo process is complete, the code view has an empty undo stack and the "undone" edits are in the code view redo stack. To complete the redo that was issued in the design view, one redo is initiated in the code view in step 609. In step 610, the edit is taken from the top of the code view redo stack and the corresponding edit is performed on the file data structure. If a subsequent redo command is issued by the user, the code view determines whether any edits remain in the code view redo stack, in step 611. If edits exist, steps 609 and 610 are repeated. Otherwise, in step 612, focus is switched back to the design view. The code view undo stack, which now includes each of the edits redone from the code view redo stack, is synchronized with the design view in step 613. Because the code view edits have all been redone, in step 614, the stack is directly saved and encapsulated into the design view edit object located on the top of the design view undo stack; no further processing at the code view level is generally required.

Figure 7:
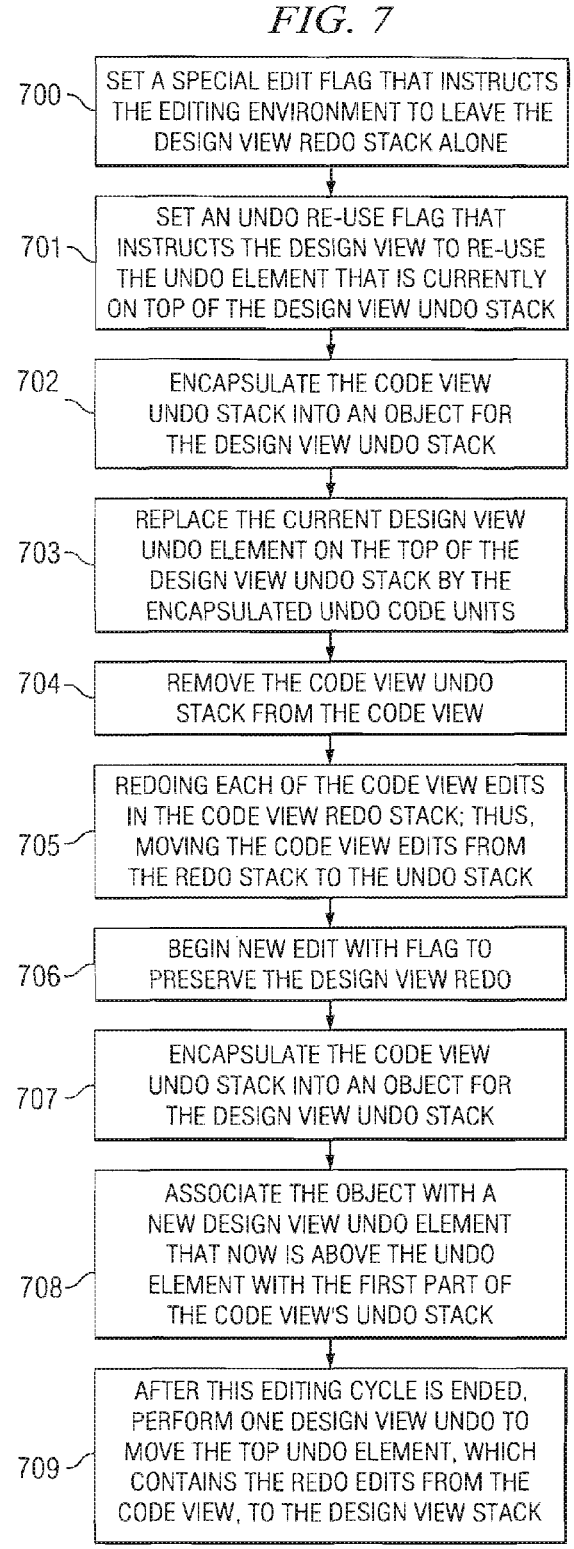
FIG. 7 is a flowchart illustrating example steps executed in implementing an embodiment of the present invention when edits exist in both the code view undo stack and the code view redo stack.

In FIG. 5, the synchronization process was described when the code view undo stack was empty, but the code view redo stack contained the edits. FIG. 6 includes a description of the synchronization process when the code view undo stack contained the edits, but the code view redo stack was empty. FIG. 7 is a flowchart illustrating example steps executed in implementing a code view-design view synchronization in an embodiment of the present invention when edits exist in both the code view undo stack and the code view redo stack. This scenario occurs when a developer performs code edits, which load onto the code view undo stack, and then performs an undo on some, but not all of those code edits. A synchronization is triggered if the developer then changes the focus to the design view. Once triggered, the system must handle the synchronization of both the code view undo stack and code view redo stack with their design view counterparts.

In step 700, a special edit flag is set which instructs the editing environment to leave the design view redo stack alone. In normal situations, when an edit cycle continues, the redo stack would be deleted. An undo re-use flag is then set in step 701 that instructs the design view to re-use the undo element that is currently on top of the design view undo stack. This design view undo object currently contains all of the current set of encapsulated code edits, both those which have been and those which have not been undone. The code view undo stack contains the code edits which have not been undone and the code redo stack contains those which have been undone. In step 702, the code view undo stack is encapsulated into an object for the design view undo stack. The current design view undo element on the top of the design view undo stack is then replaced, in step 703, by the encapsulated edits in the code undo stack. In step 704, the code view undo stack is removed so that the code view has edits in the redo stack only.

In step 705, the code view redoes all of the code view edits that are in the code view redo stack; thus, moving the code view edits from the redo stack to the undo stack. A new edit cycle is begun, in step 706, in which the special edit flag is again set directing the editing environment to preserve the design view redo stack. The code view undo stack is encapsulated into an object for the design view undo stack in step

707. In step 708, the object is associated with a new design view undo element that is pushed onto the top of the design view undo stack. In step 709, after this editing cycle is ended, one flagged design view undo is performed to move the top undo element, which contains the redo edits from the code view, to the design view redo stack. The flagged undo is an undo with a flag associated with it that instructs the design view to perform one undo, in step 709, yet ignore the fact that the undo is an encapsulated set of code view edits. Thus, the top element on the design view undo stack contains the code view undo edits, while the top element on the design view redo stack contains the code view redo edits.

Figure 8:
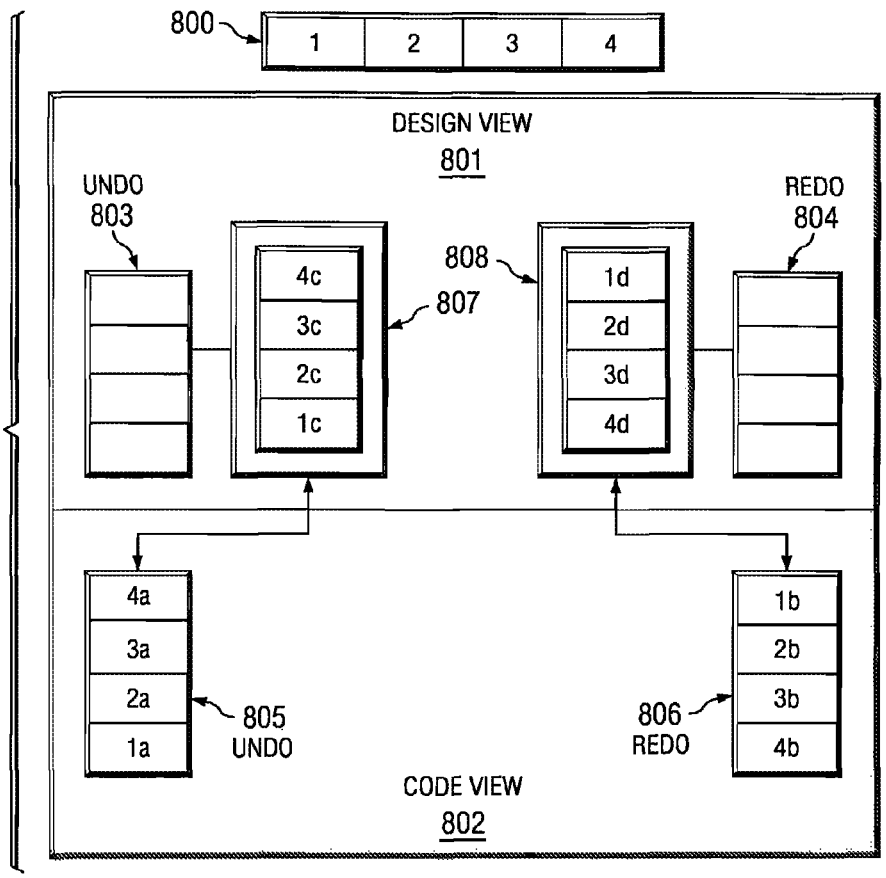
FIG. 8 is a block diagram illustrating an additional embodiment of the present invention.

FIG. 8 is a block diagram illustrating an additional embodiment of the present invention. Edit sequence 800 represents the sequence of four code edits performed by a developer. Edit 1 is the first edit performed; edit 2 is the second, and so forth. As the developer works in code view 802 making edits 1-4, each of the edits is placed in code view undo stack 805. As the first edit performed, edit 1a is placed into code view undo stack 805 first, such that at the end of edit 4, edit 1a is at the bottom of code view undo stack 805 while edit 4a is at the top. Thus, an undo command issued by the developer would take edit 4a off of code view undo stack 805 and undo the edit in the file data structure.

Similarly, if the developer were to undo each of the four edits, each of the undone edits is then placed into code view redo stack 806. Because edit 4a would be the first edit undone, it is the first edit placed in code view redo stack 806 as edit 4b. After each of the edits is undone, edit 4b is at the bottom of code view redo stack 806 while edit 1b is at the top.

In the embodiment of the editing environment described in FIG. 8, either or both of code view undo stack 805 and code view redo stack 806 may be saved and synchronized with design view 801. Therefore, if the developer changes the focus of the editing environment into design view 801 when code view undo stack 805 contains edits 1a-4a, edits 1a-4a are encapsulated into object 807 that is attached or associated with a design view edit in design view undo stack 803. The order of edits in encapsulating object 807 corresponds to the order of edits in code view undo stack 805 with edit 1c on the bottom and edit 4c on the top.

Similar to the actions in the synchronization of code view undo stack 805 with design view undo stack 803, when the user changes focus of the editing environment from code view 802 to design view 801 with code view redo stack 806 containing edits 1b-4b, object 808 encapsulates edits 1b-4b and attaches or associates those edits with a design view edit in design view redo stack 804. The order of edits in encapsulating object 808 corresponds to the order of edits 1b-4b found in code view redo stack 806, with edit 4d on the bottom and 1d on top.

In operation, if the developer performs an undo in design view 801 in which object 807 is associated, object 807 unpacks edits 4c-1c and loads them into code view undo stack 805 in the order of edits 4a-1a. Focus is shifted by design view 801 to code view 802 to perform the first code view undo. In similar operation, if the developer performs a redo in design view 801 in which object 808 is associated, object 808 unpacks edits 1d-4d and loads them into code view redo stack 806 in the order of edits 1b-4b. Focus would then be shifted by design view 801 to code view 802 in order to perform the first code view redo.

FIG. 9A is a pseudocode listing illustrating a conceptualized code view undo stack. Code undo stack 90 contains a number of edits represented by each of the <edit></edit> entries in edits section 91. In the example illustrated in FIG. 9A, the user entered the text 'H,' 'O,' 'R,' 'N,' and 'S' in the code view of the editing environment. Because the first letter entered was 'H,' is located at the bottom of code undo stack 90. After making the text entries, if the user were to select an undo operation, the top entry, 'S,' of edits 91 in code undo stack 90 would be removed and restored.

Figure 9B:
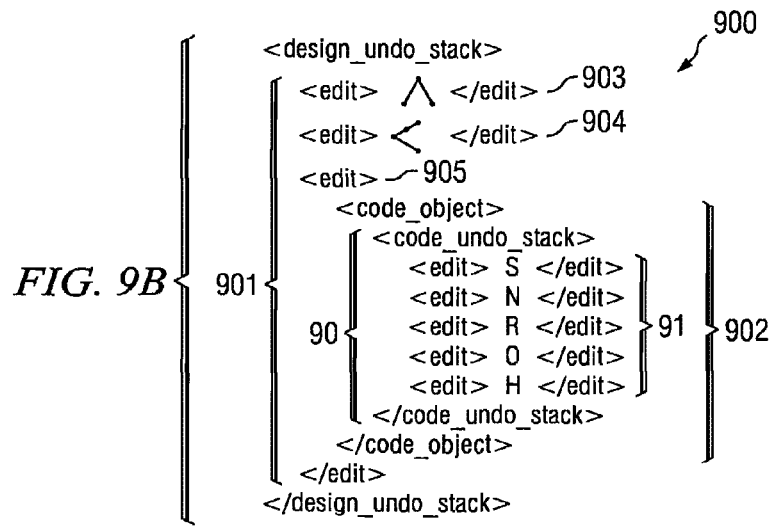
FIG. 9B is a pseudocode listing illustrating a conceptualized design view undo stack.

FIG. 9B is a pseudocode listing illustrating a conceptualized design view undo stack. Design undo stack 900 contains a number of design edits represented by each of the <edit></edit> entries in code edits 901. Design edits 903 and 904 are normal design view edits shown with the DOM snapshots. However, design edit 905 contains code object 902, which represents the code edit object containing the contents of code undo stack 90. In order to implement code object 902, the tags <code_Object></code_Object> wrap around code undo stack 90 and edits section 91. Thus, code undo stack 90 is encapsulated in code object 902. When the design view undo operation detects code object 902, code undo stack 90 would be unwrapped and reinstalled in the code view.

It should be noted that while the example illustrated in FIG. 9B shows code object 902 encapsulating all of code undo stack 90, additional or alternative embodiments of the present invention may only wrap or encapsulate edits section 91 from code undo stack 90.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for restoring one or more code view edits while operating in a design view of a dual-view editing environment, said method comprising:
   encapsulating said one or more code view edits into an edit object for use after moving from said code view to said design view;
   associating said edit object with a design edit element stored on a design view edit stack;
   receiving a command in said design view to restore said one or more code view edits;
   unpacking said one or more code view edits from said edit object responsive to said command; and
   loading said one or more code view edits into a code view edit stack.

2. The method of claim 1 further comprising:
   prompting said code view to restore at least one said one or more code view edits from said code view edit stack.

3. The method of claim 2 wherein said code view edit stack is a code undo stack, said method further comprising:
   removing said restored said one or more code view edits from said code undo stack; and
   placing said removed said one or more code view edits onto a code redo stack.

4. The method of claim 3 further comprising:
- wrapping each of said one or more code view edits remaining in said code undo stack in an updated edit object associated with a design view undo stack edit element; and
- wrapping each of said one or more code edits in said code redo stack in a redo edit object associated with a design view redo stack edit element.

5. The method of claim 3 wherein contents of said code undo stack are passable to said design view, further comprising:
- encapsulating each of said one or more code view edits remaining in said code undo stack in an updated edit object associated with a design view undo stack edit element;
- placing each of said one or more code edits on said code redo stack onto said code undo stack;
- encapsulating each of said one or more code edits from said code redo stack into a redo edit object associated with another design view undo stack edit element; and
- moving said another design view undo stack edit element onto a design view redo stack, wherein a resulting top element on said design view undo stack is said updated edit object.

6. The method of claim 2 wherein said code view edit stack is a code view redo stack, said method further comprising:
- removing said restored said one or more code view edits from said code redo stack; and
- placing said removed said one or more code view edits onto a code undo stack.

7. The method of claim 6 further comprising:
- wrapping each of said one or more code view edits remaining in said code redo stack into an updated edit object associated with a design view undo stack edit element; and
- wrapping each of said one or more code edits in said code undo stack into an undo edit object associated with a design view undo stack edit element.

8. The method of claim 6 wherein contents of said code redo stack are passable between a design view undo stack and a code undo stack, said method further comprising:
- prior to said unpacking, moving said design edit element associated with said edit object from said design view redo stack to said design view undo stack; and prior to said loading, inserting said one or more code view edits into said code undo stack.

9. A non-transitory computer readable medium executing a dual-view editing environment comprising:
- a code edit stack for storing at least one code edit when a code editing view is active;
- a design edit stack for storing design edits; and
- a code edit handler operable to:
  - encapsulate said at least one code edit into an object associated with an element on said design edit stack for use after moving from said code editing view to said design editing view; and
  - reinstate said at least one code edit from said object to said code edit stack responsive to selecting to restore said at least one code edit from said design editing view.

10. The non-transitory computer readable medium executing a dual-view editing environment of claim 9 wherein said code edit stack comprises one of:
- a code view undo stack; and
- a code view redo stack.

11. A method comprising:
- wrapping at least one code view edit into a code edit object for use after focus of a multi-view editing environment moves from a code view to a design view;
- associating said code edit object with an edit element stored on a design view edit stack;
- unwrapping said at least one code view edit from said code edit object responsive to said edit restore command; and
- inserting said at least one code view edit into a code view edit stack.

12. The method of claim 11 further comprising:
- triggering said code view to restore one or more of said at least one code view edit from said code view edit stack.

13. The method of claim 12 further comprising:
- removing said restored said at least one code view edit from said code undo stack; and
- storing said removed said at least one code view edits onto a code redo stack.

14. The method of claim 13 further comprising:
- wrapping each of said at least one code view edit remaining in said code undo stack in an updated code edit object associated with a design view undo stack edit element; and
- wrapping each of said at least one code edit in said code redo stack in a redo code edit object associated with a design view redo stack edit element.

15. The method of claim 13 wherein only contents of said code undo stack may be exchanged with said design view, the method further comprising:
- encapsulating each of said at least one code view edit remaining in said code undo stack in an updated code edit object associated with a design view undo stack edit element;
- inserting each of said at least one code edit on said code redo stack onto said code undo stack;
- encapsulating each of said at least one code edit from said code redo stack into a redo code edit object associated with another design view undo stack edit element; and
- transferring said another design view undo stack edit element onto a design view redo stack, wherein a resulting top element on said design view undo stack is said updated code edit object.

16. The method of claim 12 wherein said code view edit stack is a code view redo stack, said system further comprising:
- removing said restored said at least one code view edit from said code redo stack; and
- placing said removed said at least one code view edit onto a code undo stack.

17. The method of claim 16 further comprising:
- wrapping each of said at least one code view edit remaining in said code redo stack into an updated code edit object associated with a design view undo stack edit element; and
- wrapping each of said at least one code edit in said code undo stack into an undo code edit object associated with a design view undo stack edit element.

18. The method of claim 16 wherein only contents of a code undo stack may be exchanged with a design view undo stack and said code undo stack, the method further comprising:
- moving said design edit element associated with said code edit object from said design view redo stack to said design view undo stack; and
- placing said at least one code view edit into said code undo stack.

19. A computer program product having a non-transitory computer readable medium with computer program logic recorded thereon for restoring at least one code view edit from a design view of a multi-view editing environment, said computer program product comprising:

code for encapsulating said one or more code view edits into an edit object for use after moving from said code view to said design view;

code for associating said edit object with a design edit element stored on a design view edit stack;

code for receiving a command in said design view to restore said one or more code view edits;

code for unpacking said one or more code view edits from said edit object responsive to said command; and code for loading said one or more code view edits into a code view edit stack.

20. The computer program product of claim 19 further comprising:

code for prompting said code view to restore at least one said one or more code view edits from said code view edit stack.

21. The computer program product of claim 20 wherein said code view edit stack is a code undo stack, said method further comprising:

code for removing said restored said one or more code view edits from said code undo stack; and code for placing said removed said one or more code view edits onto a code redo stack.

22. The computer program product of claim 21 further comprising:

code for wrapping each of said one or more code view edits remaining in said code undo stack in an updated edit object associated with a design view undo stack edit element; and code for wrapping each of said one or more code edits in said code redo stack in a redo edit object associated with a design view redo stack edit element.

\* \* \* \* \*